United States Patent
Lee et al.

(10) Patent No.: US 7,400,604 B2
(45) Date of Patent: Jul. 15, 2008

(54) PROBING METHOD FOR FAST HANDOFF IN WLAN

(75) Inventors: In-Sun Lee, Seoul (KR); Kyung-Jun Jang, Suwon-si (KR); Min-Ho Shin, Laurel, MD (US); William Albert Arbaugh, Ellicott City, MD (US); Arunesh Mishra, Greenbelt, MD (US)

(73) Assignees: Samsung Electronics Co., Ltd. (KR); The University of Maryland College Park, College Park, MD (US)

( * ) Notice: Subject to any disclaimer, the term of this patent is extended or adjusted under 35 U.S.C. 154(b) by 284 days.

(21) Appl. No.: 11/141,179

(22) Filed: May 31, 2005

(65) Prior Publication Data

US 2006/0092883 A1    May 4, 2006

Related U.S. Application Data

(60) Provisional application No. 60/576,002, filed on May 31, 2004.

(30) Foreign Application Priority Data

Nov. 8, 2004    (KR) .................... 10-2004-0090573

(51) Int. Cl.
*H04Q 7/00*    (2006.01)

(52) U.S. Cl. .............. 370/332; 370/331; 370/329; 455/439; 455/436

(58) Field of Classification Search .......... 370/332, 370/331, 329; 455/439, 436
See application file for complete search history.

(56) References Cited

U.S. PATENT DOCUMENTS

| | | | |
|---|---|---|---|
| 2003/0069018 A1* | 4/2003 | Matta et al. ............... | 455/436 |
| 2003/0203735 A1* | 10/2003 | Andrus et al. ............. | 455/450 |
| 2004/0219918 A1* | 11/2004 | Kakishima et al. ........ | 455/436 |
| 2005/0138178 A1* | 6/2005 | Astarabadi ................ | 709/227 |
| 2006/0099952 A1* | 5/2006 | Prehofer ................... | 455/440 |

* cited by examiner

*Primary Examiner*—Danh C Le
(74) *Attorney, Agent, or Firm*—McNeely Bodendorf LLP (57) ABSTRACT

Provided is a probing method for handoff including constructing a group of neighbor access points of a current access point with which the station associated, generating subgroups of the neighbor access points by the channel assigned to the access points, probing the access points by subgroup in a subgroup selection order, and selecting the neighbor access point having best link quality as a target access point to handoff. The probing method of the present invention is implemented with a novel non-overlap graph for constructing the neighbor graph such that the probing latency is dramatically reduced, resulting in reduction of handoff delay.

11 Claims, 6 Drawing Sheets

PROBING METHOD FOR FAST HANDOFF IN WLAN

PRIORITY

This application claims priority under 35 U.S.C. § 119 to an application entitled "An Efficient Handoff Scheme in IEEE 802.11 Using Neighbor Graph" filed in the United States Patent and Trademark Office on May 31, 2004 and assigned Ser. No. 60/576,002, and to an application entitled "Probing Method For Fast Handoff In WLAN" filed in the Korean Intellectual Property Office on Nov. 8, 2004 and assigned Serial No. 2004/90573, the contents of both of which are incorporated herein by reference.

BACKGROUND OF THE INVENTION

1. Field of the Invention

The present invention relates to a wireless communication system, and in particular to a probing method for fast handoff between access points.

2. Description of the Related Art

The de facto standard for wireless local area networks (WLAN) is Institute of Electrical and Electronics Engineers (IEEE) standard 802.11 communication system. This standard enables low-cost and effective WLAN services. An unlicensed spectrum (2.4 GHz in 802.11b/g and 5 GHz in 802.11a) used by the IEEE 802.11 standard allows the deployment of low-cost WLANs. A Medium Access Control (MAC) protocol provides high-bandwidth communication systems with bandwidths of up to 11 Mbps in 802.11b and 55 Mbps in 802.11a.

To date, WLAN devices have been integrated into mobile PCs and other mobile devices. Moreover, the 802.11 standard is being incorporated into a fourth generation (4G) cellular system because of the high bandwidth of WLAN. In fact, WLANs using the 802.11 standard are successfully deployed in public areas such as airports, hotels, universities and shopping centers.

However, as user mobility increases, the small cell size as defined by the 802.11 standard in WLANs can induce frequent handoffs, causing inevitable communication delays, because the handoff process includes finding a new best available access point (AP) and establishing association to that AP (layer-2 handoff). For Internet Protocol (IP) connectivity, an additional process of layer-3 handoff should be completed. Voice over IP (VoIP), one of the most popular applications of WLAN, requires a maximum end-to-end delay of 50 ms. Unfortunately, a majority of WLANs cannot complete the layer-2 handoff process in 100 ms. Moreover, handoff latencies between 60 ms and 400 ms are typical depending on the type and manufacturer of a wireless card or access point. Furthermore, a Probe Phase (the discovery of next AP) is known to be a dominating factor in handoff latency, accounting for more than 90% of overall handoff latency.

A proving latency is affected significantly by two parameters: probe count and probe-wait time. As defined by the 802.11 standard, the probe count equals the number of channels to probe, and the probe-wait time is between MinChannelTime and MaxChannelTime. MinChannelTime and MaxChannelTime are defined as being approximately 7 ms and 11 ms, respectively. Since the IEEE 802.11 standard does not specify which channels to probe, wireless cards use their own heuristic algorithms. These algorithms are categorized into full-scanning and observed-scanning. The full-scanning algorithm is a brute force algorithm that probes all legitimate channels (e.g., 11 channels in the United States). Observed-scanning restricts probing channels to a subset of legitimate channels which has been observed by previous probes. Independent channels are channels that provide enough frequency separations to co-locate several radio links without interference. Three channels (1, 6, and 11) are known to be independent in 802.11b. That is, in a proper deployment of 802.11b, the observed-scanning probes only these three channels, reducing probe count from 11 to 3. However, the observed-scanning algorithm can suffer when it must probe a long list of channels which happens when a sufficient number of independent channels are provided. For example, an emerging new WLAN standard known as the 802.11a standard, provides 12 independent channels for implementation in the United States. To benefit from an abundant number of channels, WLANs can use all 12 channels throughout the network. Therefore, the 802.11a standard will increase the number of used channels by 4 foldover the 802.11b standard, thereby increasing the probing latency of observed-scanning by a similar proportion.

Accordingly, a method for minimizing the probing latencies caused by the increasing channel numbers so as to provide a seamless handoff in WLAN systems is desirable.

SUMMARY OF THE INVENTION

The present invention has been made in an effort to solve the above problem, and it is an object of the present invention to provide a probing method capable of minimizing a handoff latency by using a neighbor graph (NG).

In order to achieve the above object, the probing method for handoff according to one aspect of the present invention constructs a group of neighbor access points of a current access point with which a station is associated, generates subgroups of the neighbor access points by a channel assigned to the access points, probes the access points by subgroup in a subgroup selection order, and selects a neighbor access point having best link quality as a target access point to handoff.

Preferably, the step of probing the access points includes transmitting a probe request message to the neighbor access points of a first subgroup, starting a timer upon transmitting the probe request message, the timer defining a minimum channel time and a maximum channel time, determining whether the probe response message is received in response to the probe request message before the minimum channel time expires, and probing the neighbor access points of a next subgroup if no probe response message is received.

Preferably, the step of probing the access points further includes determining whether the probe response message is received from all the access points in the subgroup if the response is received and probing the neighbor access points of a next subgroup to probe if the probe response message is received from all the access points in the subgroup.

Preferably, the step of probing the access points further includes determining whether the maximum channel time expires if the probe response message is received not all the access points in the subgroup and probing the neighbor access points of a next subgroup to probe if the maximum channel time expired.

Preferably, the minimum channel time is shorter than the maximum channel time.

In another aspect of the present invention, the probing method for handoff constructs a group of neighbor access points of a current access point with which a station associated, generates subgroups of the neighbor access points by a channel assigned to the access points, generates non-overlap graphs of the respective subgroups, selects one of the subgroups to probe on the basis of degrees of the non-overlap graphs, probes the access points of the selected subgroup, and selects one of the access points having a best quality as a target access point to handoff.

Preferably, the non-overlap graph has pairs of access points connected through an edge, coverage areas of the access points of each pair being non-overlapped.

Preferably, the degree of the non-overlap graph is an average number of edges of the access points of the subgroup.

Preferably, the step of probing the access points includes transmitting a probe request message to the access points of the selected subgroup, starting a timer upon transmitting the probe request message, the timer defining a minimum channel time and a maximum channel time, determining whether the probe response message is received in response to the probe request message before the minimum channel time expires, and selecting a next subgroup to probe if no probe response message is received.

Preferably, the step of selecting the best available access point further includes removing access points having the non-overlap relationship with the access points transmitting the probe response message from the non-overlap graph if a probe response message received, determining whether access point exist in the subgroup, and selecting a next subgroup to probe if no access point exists.

Preferably, the step of selecting the best available access point further includes determining whether the maximum channel time is expired if there remains any access point in the subgroup and selecting a next subgroup to probe if the maximum channel time is expired.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

Handoff methods according to the embodiments of the present invention will be described with reference to the accompanying drawings.

The present invention proposes a handoff method which is capable of reducing the number of channels to probe and the probe-wait time using a neighbor graph (NG) as a local topology in handoff procedure.

Figure 1:
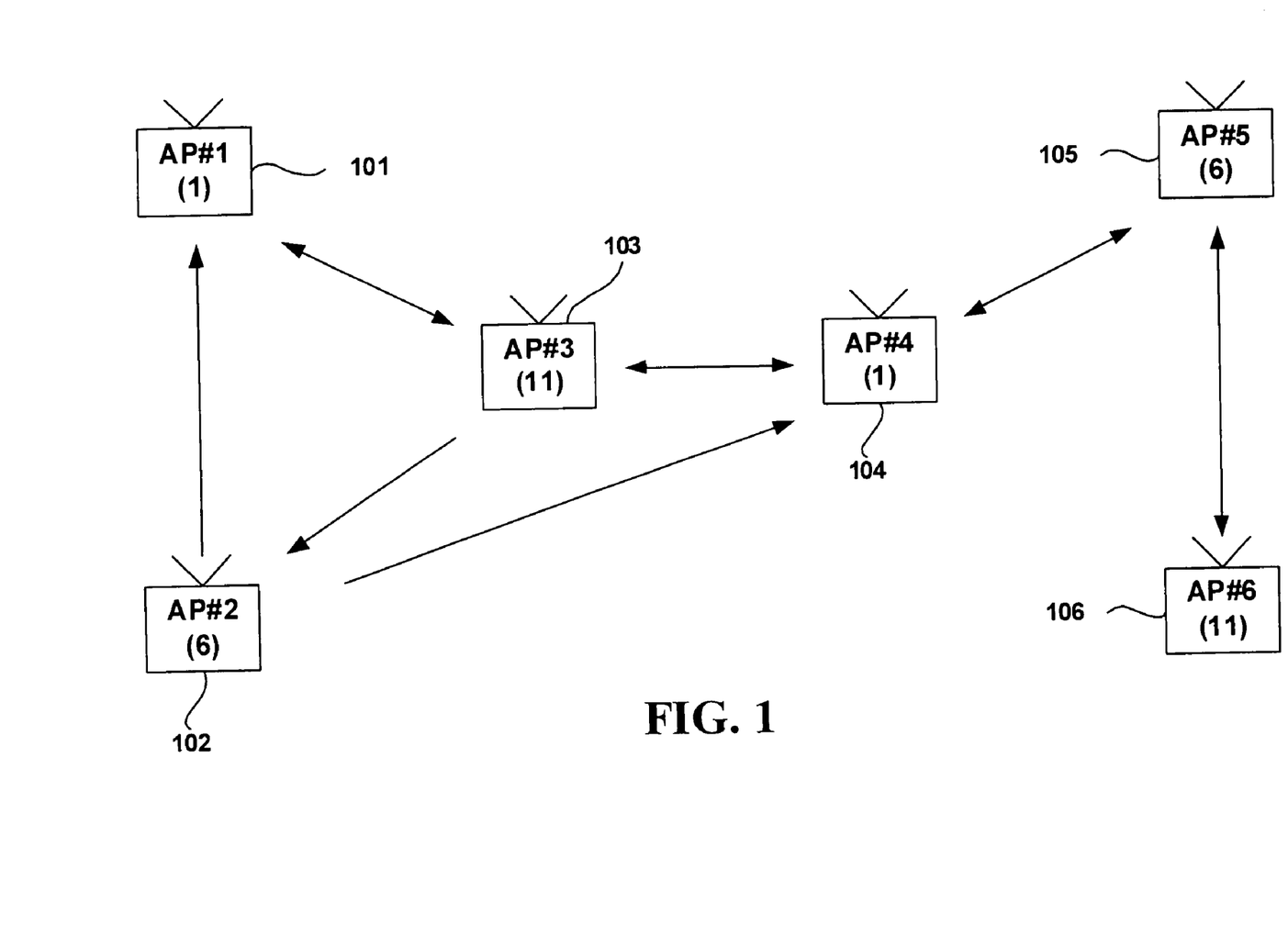
FIG. 1 is a schematic view illustrating a neighbor graph to be adopted to a probing method for handoff according to the present invention.

FIG. 1 is a neighbor graph adopted to a probing method for the handoff according to the present invention.

Neighbor graphs are conceptual graphs which illustrate a handoff relationship between access points (Aps) A plurality of APs 101, 102, 103, 104, 105, and 106 have handoff relationships to each other. The arrows show directions the APs can handoff to. For example, AP#4 104 has a bidirectional handoff relationships with AP#3 103 and AP#5 105 such that a mobile station (not shown) can handoff from the AP#4 104 to AP#3 103 or AP#5 105 and from the AP#3 103 or AP#5 105 to the AP#4 104. Also, the AP#4 104 has a unidirectional handoff relationship with AP#2 102 such that the mobile station can handoff only from AP#2 102 to AP#4 104.

The handoff relationship is generalized such that if a mobile station can handoff from $AP_i$ to $AP_j$, the two APs are neighbors.

In WLANs, to overcome small coverage of access point (e.g., 30 meters in 802.11b and much smaller in 802.11a), multiple APs are necessary to cover a large area. Although the main reason of employing multiple APs for WLAN and the cellular system differ from each other, the WLAN system is subject to the cellular concept.

The limited number of non-overlapping channels (e.g., 3 for the 802.11b and 12 for 802.11a) also necessitate well-designed channel assignments to avoid interference. The non-overlapping channels, or independent channels, are channels that provides enough frequency separation to co-locate several radio links without interfering with each other.

In 802.11b, two channels separated by more than 5 channels are known to be independent. FIG. 1 shows a drawing for illustrating an ideal channel assignment in an 802.11b system. Handoff is another challenge in WLAN to provide users with high bandwidth communications and support of user mobility at the same time. In third generation (3G) mobile systems, a mobile station can conduct seamless handoffs by activating several radio links simultaneously (soft handoff). Unlike 3G mobile stations, an IEEE 802.11 mobile station should complete handoff process using only a single radio link (hard handoff). This limitation makes seamless handoff hard to achieve.

In WLAN, a station leaving a current AP is required to initiate a handoff process for finding a next AP and establishing a link with that AP. The stations need to handoff for service communication and load balancing of the system. Properly designed handoffs also should be done early enough to avoid interference with stations in other cells which is a process known as cell dragging. To make handoff imperceptible to users, a fast handoff is critical. For example, a handoff completed less than 50 ms allows a VoIP user not only continuous conversation, but also unnoticeable transmission of the call. However, a handoff which is longer than 50 ms can cause a disruption of service. A poorly designed handoff can incur ping-pong handoffs due to momentary fading of signal strength. Therefore, when and how to handoff is a very important design challenge in WLAN.

A neighbor graph is an aggregation of personal neighbor graphs with directed edges. Assuming $AP=\{AP_1, AP_2, \ldots, AP_n\}$, a set of APs in a WLAN under consideration. The association pattern (or mobility pattern) of a station c during a finite period of time can be denoted as $\Gamma(c)=\langle AP_{c1}, AP_{c2}, \ldots, AP_{ck}\rangle$, where k is the number of access points that served the station and $AP_{ci}$ is the ith such AP. For simplicity, assuming that each transmission to a next AP is done by reassociation, a personal neighbor graph $PG(c)=<V,E>$ for station c can be conducted from the sequence $\Gamma(c)$, where V=AP and $E=\{<AP_i, AP_j>|AP_i \text{ and } AP_j \text{ are successive in } \Gamma(c)\}$. These edges reflect the handoff relationships between APs. Personal neighbor graphs are directed graphs that reflect the mobility patterns of stations in their own WLAN environment. Moreover letting C be a set of stations in the network and PG(c) be the personal neighbor graph of the station c∈C. Then, the neighbor graph (NG) is defined by Equation 1.

$$NG = \bigcup_{c \in C} PG(c) \qquad \text{Equation 1}$$

The handoff relationship reflects the AP's geographical closeness to each other despite symmetry of handoff in theory, in reality, the handoff is often asymmetric, i.e., a handoff relationship from $AP_i$ to $AP_j$ does not imply the handoff relationship from $AP_j$ to $AP_i$. Asymmetry of a handoff relationship is due to geographical characteristics, irregularity of radio coverage, high AP density, or unidirectional mobility patterns of users. In the experiment, it is observed that 57% of combinations of APs with a handoff relationship have an asymmetric handoff relationship.

Degree of an AP in a neighbor graph is defined as the number of outward edges from that AP. This represents the number of neighbors to which a station can handoff. With a sufficient number of independent channels as in the 802.11a standard, the degree of an AP bounds (determines so as to reduce) the number of probings in NG and NG-pruning algorithms, thus affecting the performance of the algorithms.

Despite an irregular contour of radio coverage, in reality, a circular model is considered to be ideal shape of a cell with one AP. However, a common hexagon model is adopted herein for the sake of clarity. Under a hexagon tessellation model, a maximum number of neighbor cells is six in a 2-dimensional plane. In reality, the maximum degree of a neighbor graph tends to be smaller in buildings due to the structure of the building and limited freedom of mobility. Experimentally, the average number of neighbors is found to be equal to about 3.15.

When the network needs to co-locate multiple access points for high user capacity, the handoff process must consider load balancing among APs. A neighbor graph with knowledge of neighbor's current loads can be used for such load balancing handoff. In this case, a neighbor count can be over 6.

In the present invention, two metrics are used for deciding the qualities of neighbor graphs. A neighbor graph is an approximation of the actual mobility graph for mobile stations. Given a set of m users stations $U=\{u_1, u_2, \ldots, u_m\}$, denote the aggregation of actually mobility graphs of the stations U as $M_U$ and $M_U$ is a directed graph such that $M_U=(V,E_M)$ where $E_M$ is the set of edges and V is the set of APs.

One of the two metrics is "error of neighbor graph." Assuming that $N=(V,E_N)$ is a neighbor graph, $E_N$ is the set of edges, and V is the set of APs, the error of the neighbor graph is defined as the ratio of missing edges to the number of edges in actual mobility graph and can be defined by Equation 2.

$$Er(N, M_U) \stackrel{def}{=} \frac{|E_M - E_N|}{E_M} \qquad \text{Equation 2}$$

Equation 2 takes a value in [0, 1] and Er is an error probability. If $Er(N,M_U)=0$, the neighbor graph is valid. The error of the neighbor graph also represents the probability that a station handoffs to an AP which is not a neighbor in the graph. With an error of non-zero, the NG algorithm fails to provide the same quality of service as other algorithms that are not adopting a neighbor graph.

For example, with some missing edges, NG-based probing fails to discover as best AP as full-scanning or observed-scanning schemes. Therefore, maintaining an NG as close to a valid graph (i.e., $Er(N,M_U)=0$) as possible is important. It should be noted that when the error of a neighbor graph is zero, (i.e., when $Er(N,M_U)=0$), the neighbor graph is a valid graph.

The other metric for deciding the quality of the neighbor graph is "overhead of neighbor graph." The overhead of the neighbor graph (Ov) is defined as the ratio of redundant edges to the number of edges in actual mobility graph and can be defined by Equation 3.

$$Ov(N, M_U) \stackrel{def}{=} \frac{|E_N - E_M|}{E_M} \qquad \text{Equation 3}$$

As with Equation 2, Equation 3 also takes a value in [0, 1]. If $Ov(N,M_U)=0$, the neighbor graph N is compact. The overhead of a neighbor graph also represents the probability that an edge in the neighbor graph is not to be roamed over by any stations.

Moreover, even with a valid neighbor graph, redundant edges can impair the performance of an algorithm using the neighbor graph. This problem can be overcome by discarding obsolete edges using a timeout mechanism.

An overlap graph (OG) is an undirected graph over AP, the set of all APs in the network. An edge of overlap graph, $<AP_i, AP_j>$ represents an overlapping relationship between APs. $AP_i$ and $AP_j$ overlap if there exists a location where a station can communicate to both of them with an "acceptable" link quality. An acceptable link quality means a link quality which is sufficient to avoid the handoff being unnecessarily triggered. Such APs are said to be "reachable" from the station and otherwise, said to be "unreachable." The neighbor graph is a subset of overlap graph and can be defined by Equation 4.

$$NG \subseteq OG \qquad \text{Equation 4}$$

When the edges of an overlap graph are considered bidirectional edges, the overlap graph is a valid neighbor graph and can be defined by Equation 5.

$$Er(OG)=0 \qquad \text{Equation 5}$$

But OG is not necessarily compact (Ov(OG)>0).

A Non-Overlap Graph (NOG) is an undirected graph, and it is the complement of an overlap graph, meaning that $<AP_i, AP_j>$ is an edge in Non-overlap graph if and only if $<AP_i, AP_j>$ is not an edge of overlap graph. This can be defined by equation 6.

$$NOG \stackrel{def}{=} OG^c \qquad \text{Equation 6}$$

In principle, the reachability to one of non-overlapping APs implies the unreachability to the other AP. From this, a pruning algorithm can be implemented.

The NG based probing algorithm according to one embodiment of the present invention will be described hereinafter.

As described above, the main factors affecting the probing latency are the number of channels to probe (probe-channel count) and the waiting time on each probed channel (probe-wait time). The probe-channel count and the probe-wait time can be reduced by using a well designed algorithm.

An exemplary NG-based probing algorithm according to one embodiment of the present invention is shown in the following Table 1.

TABLE 1

<NG-based probing algorithm>

```
 1:    P={P_i}, a partition of neighbors,
             where all APs in P_i have channel i
 2:    while P≠0 do
 3:        pick P_i from P
 4:        P=P- P_i
 5:        Broadcast probe request on channel i
 6:        Start probe timer
 7:        If medium is idle until MinChannelTime expires then
 8:            continue
 9:        else if all access points in P_i reply then
10:            continue
11:        else if MaxChannelTime expires then
12:            continue
13:        end if
14:    end while
```

Figure 3:
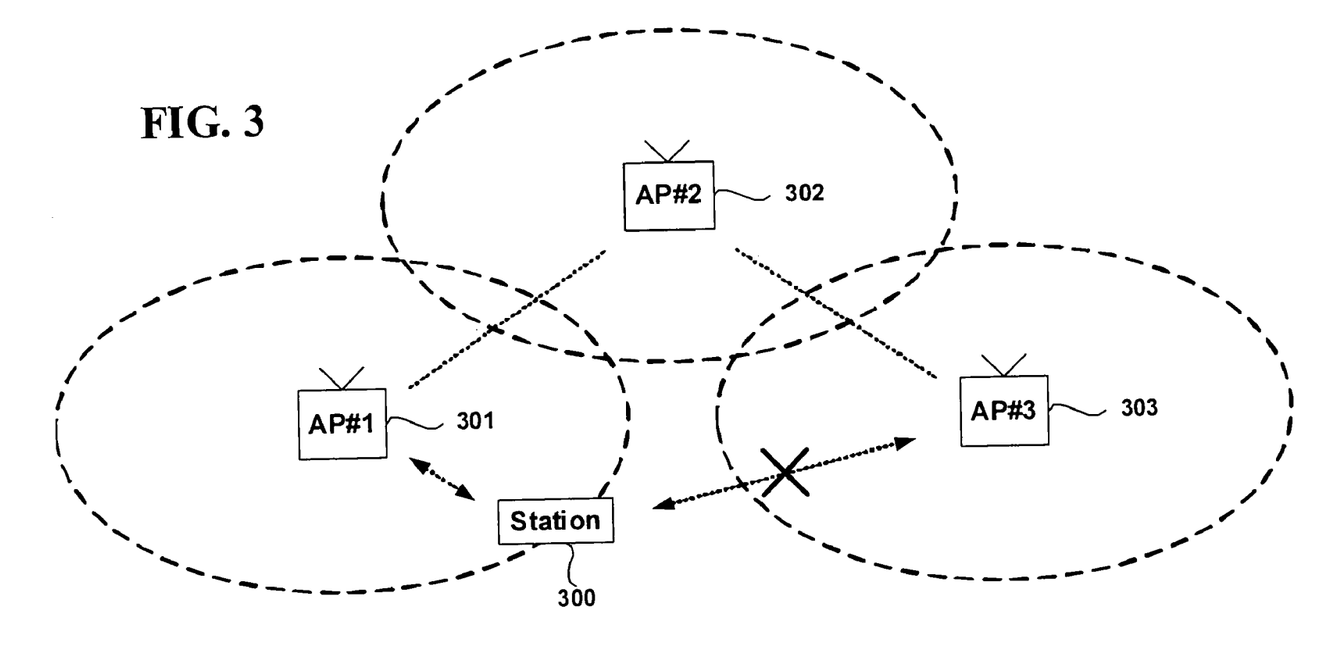
FIG. 3 is a schematic view illustrating a principle of a non-overlap graph according to a second embodiment of the present invention.

In this algorithm, a partition of neighbor APs P is constructed based on the neighbor AP's channels. Setting a neighbor channel count to be equal to the number of distinct channels used by neighbor APs, using P, the algorithm probes only not-empty (AP existing) channels and removes unnecessary channels as shown in FIG. 3. This is called "minimum-channel probing." In line 9, the algorithm shortens the probe-wait time to avoid wasted probe-wait time, which is called "optimal-wait probing."

Figure 2:
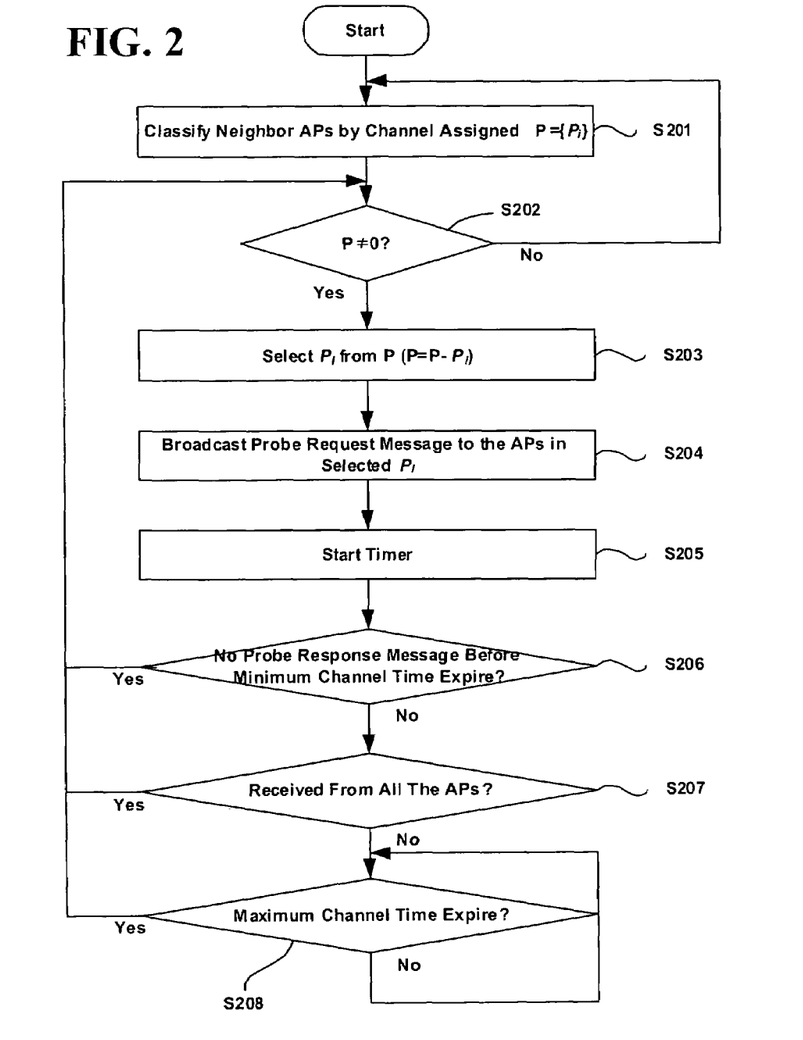
FIG. 2 is a flowchart illustrating an NG-based probing method according to a first embodiment of the present invention.

FIG. 2 is a flowchart illustrating an NG-based probing method according to one embodiment of the present invention. The station firstly classifies APs according to the respective channel indexes assigned to the Aps and constructs the subsets $P_j$ of the set P of neighbor APs for each channel at step S201. In Step S202, the station determines whether P includes any Aps (i.e., if any Aps exist in P). If there exist AP(s) in P, the station selects one of the subsets $P_j$ and deletes the selected subset from P at step S203. Upon selecting the subset $P_j$ the station broadcasts a "probing request" message to the APs belonged to the selected subset $P_j$ at step S204 and simultaneously triggers a probe timer at step S205. The probe timer defines the minimum channel response time "MinChannelTime" and the maximum channel response time "MaxChannelTime."

After the probing request message is broadcast, the station determines whether a probing response message is received in response to the probing request message before the MinChannelTime expires at step S206. If there is no probing response message, the station returns to the step S202. On the other hand, if at least one probing response message is received, the station determines whether the probing response message(s) are received from all APs in the selected subset $P_j$ at step S207. If no probing response messages are received, this indicates that all the channels are occupied by other stations.

In Step S207, if the probing response message is received from all APs in the selected subset $P_j$, the station returns to the step S202. On the other hand, in Step S207, if the probing response message is not received from all of the APs in the selected subset $P_j$, the station waits to MaxChannelTime and then returns to the step S202 when MaxChannelTime expires.

In an alternative embodiment of the present invention, the non-overlap graph is exploited for additional performance improvement in probing.

With the prior knowledge of non-overlap graph, the station prunes (e.g., deletes) all the overlapping APs with reachable (where reachable is defined a) APs. "For example, assume that $AP_i$ and $AP_j$ are non-overlapping. Once the station receives the probe response message from $AP_i$ according to a of non-overlapping principle, then the possibility to receive probe response from $AP_j$ with acceptable link quality is non-existant. Thus there is no reason to expect any response from $AP_j$ (pruned). If the station can not receive any probe response message from $AP_i$ with an acceptable link quality, then the station cannot determine there is no the reachability of $AP_j$.

FIG. 3 is an schematic view illustrating a principle of non-overlap graph according to the second embodiment of the present invention. The coverage areas of AP#1 301 and AP#2 302 are overlapped and the coverage areas of AP#2 and AP#3 are overlapped such that the pairs of AP#1-AP#2 and AP#2-AP#3 have the overlap relationships, respectively. In the meantime, the coverage areas of AP#1 301 and AP#3 303 are not overlapped so as to have a non-overlap relationship. In this situation, the station 300 currently associated with AP#1 301 can reach the AP#2 302 but not AP#3 303.

Figure 4:
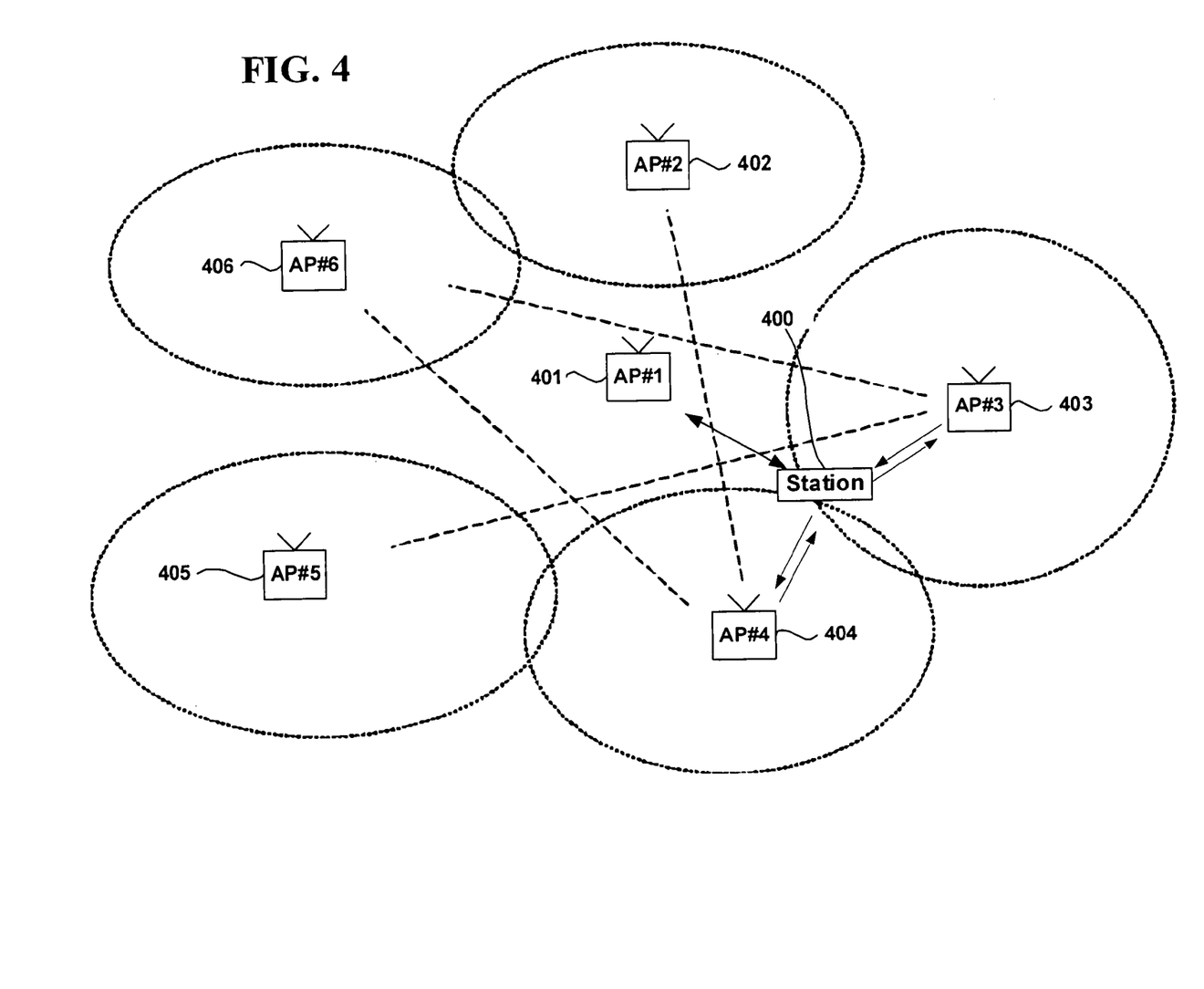
FIG. 4 is a conceptual view illustrating a NG-pruning-based probing method according to the second embodiment of the present invention.

FIG. 4 is an exemplary view illustrating the NG-pruning based probing method according to the second embodiment of the present invention. AP#4 401 has overlap relationships with 5 neighbor APs 402, 403, 404, 405, and 406. However, the station 400 can reach only AP#3 403 and AP#4 404 such that the station transmits the probing request message to the AP#3 403 and the AP#4 404. In this case, the APs (AP#2, AP#5, and AP#6) that have no overlap relations with any of AP#3 and AP#4 403 and 404 are removed from the probing list. Thus the station needs to perform the probing operation only for the two reachable APs.

An exemplary NG-pruning based probing algorithm according to one embodiment of the present invention is shown in Table 2.

TABLE 2

<NG-pruning based probing algorithm>

```
 1:    P = {P_i}, a partition of neighbors,
             where all APs in P_i have channel i
 2:    while P≠0 do
 3:        pick P_i from P
 4:        P=P=P_i
 5:        Broadcast probe request on channel-i
 6:        If medium is idle until MinChannelTime expires then
 7:            continue
 8:        end if
 9:        for all probe response from AP_r do
10:            P_i=P_i - {AP_r}
11:            D={AP|(AP_r, AP)∈NOG }
                    /* set of non-overlapping APs with AP_r */
12:            P_i = P_i - D
13:            for all P_j ∈ P do
14:                P_j = P_j - D
15:            end for
16:            if P_i=0 or MaxChannelTime Has expired then
17:                break
18:            end if
19:        end for
20:    end while
``` the NG-pruning based probing algorithm creates a local non-overlap graph, a subset of non-overlap graph comprised of only neighbor APs.

The NG-pruning based probing algorithm examines the degree of non-overlapping in such local non-overlap graph in line 3 and prunes any non-overlapping APs from $P_i$ in lines 11 and 12. By also removing the non-overlapping APs from P in lines 13 through 15, the non-overlapped APs are excluded from the channels to be probed. In this manner, the NG-pruning based probing algorithm reduces the number of the APs to probe, and can exclude channel(s) to probe.

Figure 5:
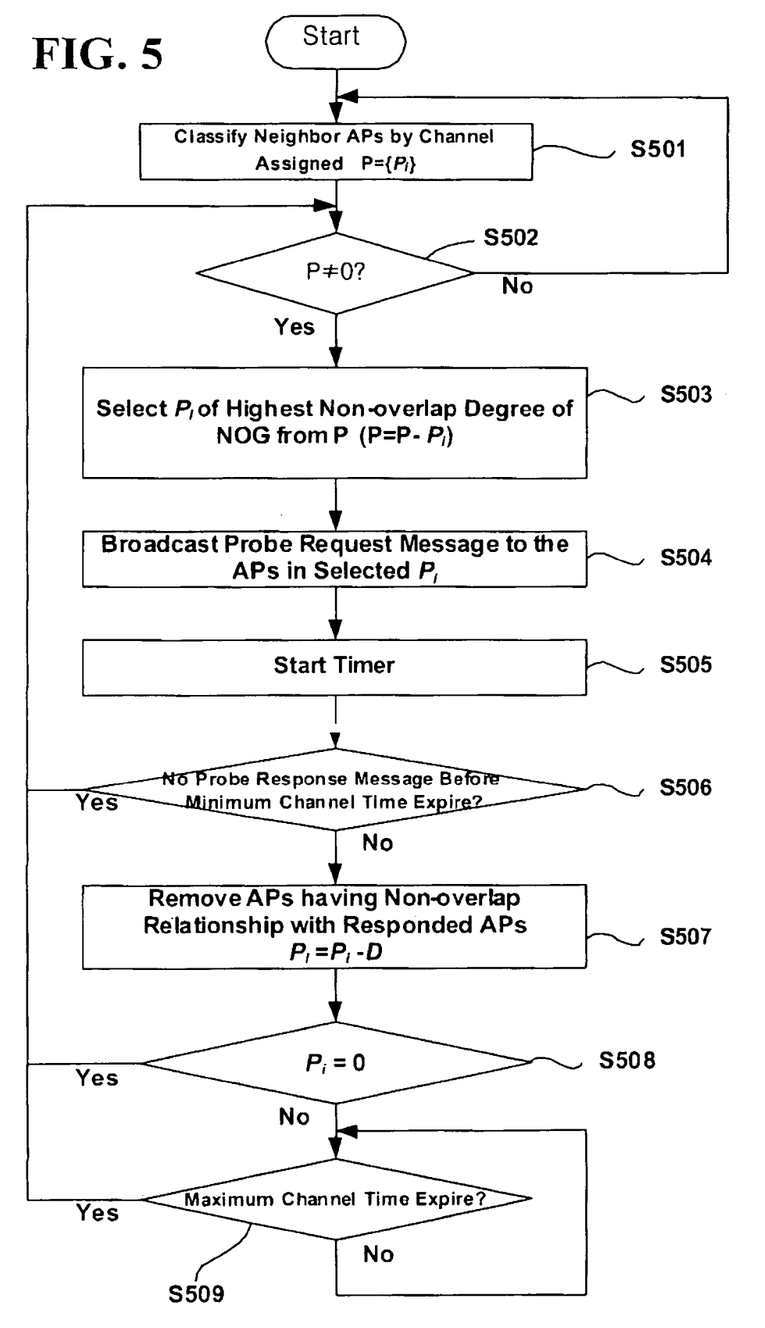
FIG. 5 is a flowchart illustrating the NG-pruning based probing method according to the second embodiment of the present invention.

FIG. 5 is a flowchart illustrating the NG-pruning based probing method according to the second embodiment of the present invention.

The station firstly classifies APs according to the channel assigned and constructs the subsets $P_i$ of the set P of neighbor APs for each channel at step S501, and determines whether P includes any APs at step S502. If there exist one or more APs in P, the station selects one of the subsets $P_i$ and deletes the selected subset from P at step S503. Upon selecting the subset $P_i$, the station broadcasts the probing request message to the APs belong to the selected subset $P_i$ at step S504 and triggers a probe timer at step S505. The probe timer defines the minimum channel response time "MinChannelTime" and the maximum channel response time "MaxChannelTime."

After the probing request message being broadcasted, the station determines whether any probing response message is received in response to the probing request message before the MinChannelTime expires at step S506. If no probing response messages are received, the station returns to the step S502. In the meantime, if the station receives the probing response message from any AP(s), the station prunes the AP(s) having the non-overlapping relationship with the AP(s) which transmitted the probing response message from the corresponding subset at step S507. Sequentially, the station determines whether there exists AP(s) in the subset at step S508. If there is no AP in the subset, the station returns to the step S502. Otherwise, the station waits until the MaxChannelTime expires and then returns to the step S502 when the MaxChannelTime expires.

In order to remove the non-overlapping APs, firstly the non-overlap graph which is derived from the overlap graph is created and it is very challenging to obtain neighbor graph and overlapping graph through an analytical method because of the irregularity of ration coverage. For example, a station in the line of sight to an AP can maintain a good link quality to that AP at up to a great distance. In contrast, a station near to the same AP often cannot obtain a link quality as good as the farther station because of obstacles between the nearby station and the AP. This unpredictability of radio coverage makes empirical methods practical and reliable for the generation of neighbor graphs and overlap graphs.

To generate an overlap graph, the stations need to espy the overlaps of cells and report their findings to the system. When the station is in a grey area, which is defined with the threshold SNR for handoff and hysteresis, the station initiates a full-scanning probing and reports found overlapping APs to the system. This is called an overlap test.

In the grey area, the probability of overlap with other APs is high. This excludes unnecessary overlap tests where the station is too close to a current AP. Excluding non-grey area from the overlap tests does not miss any overlap relationships due to the continuity of radios coverages. The overlap test probability p may be high in an initial phase for fast convergence and may decrease over time to a positive minimum value. Moreover, an overlap test may cause minimal reporting overhead to the stations. A system can have dedicated sampling phase in which a sampling station roams throughout the network, building overlap graph to expedite the creation of overlap graph.

In the conventional neighbor graph generation method, NG is always compact (Ov(NG)=0) while error is large in the beginning and may decrease to 0, a valid neighbor graph. Therefore, due to high error of the graph, NG cannot be enabled until NG becomes sufficiently close to valid neighbor graph.

To remove the possibly of a long convergence period, a system can alternatively have a dedicated NG generation phase which is similar to one for an overlap graph, in which a special station roams throughout the network adding as many edges as possible to the neighbor graph.

To reduce NG generation period, the generated overlap graph is exploited as an initial neighbor graph. The generation of the overlap graph can be completed much faster than neighbor graph because the overlap test does not require any mobility of station. For fast generation of the overlap graph in initial phase, an overlap test probability close to one can be adopted. Since OG is a superset of NG as defined by equation 4, OG is valid but not a compact neighbor graph, that is, OG does not have any missing edges but may have some redundant edges. Such redundant edges are a pair of APs that overlap each other but no handoff is possible, and are called overlap-only edges. These redundant edges will be discarded over time by timeout. Once a station handoffs along an edge in an OG, the system adds that edge to a confirmed neighbor graph. In this manner, the overhead of the initial NG will decrease to zero.

For freshness of the neighbor graph, an additional maintenance scheme is required to keep the neighbor graph adaptive to changes of both mobility patterns and an AP topology.

The changes in a user's mobility pattern degrades the accuracy of generated neighbor graph, impairing compactness and validity. For example, new handoff edges can be introduced by new mobility patterns, decreasing the validity of an NG. Also, obsolete handoff edges can harm the compactness and degrade performance. Timestamp-based least recently used (LRU) algorithm can be used for eliminating outlying edges caused by unordinary mobility or by the change of mobility patterns.

Eviction of rarely used edges, increases the compactness, thus increase the performance of NG. If a station follows a new mobility path that is not covered by current NG, an NG-probing algorithm may fail to handoff. In such case, one-time full scanning will successfully add a new edge, making the NG valid. An NG also can adapt to additions and deletions (or failures) of APs in the network. For example, when APs are deleted, all the edges to such APs will be evicted by their inactivity for long time. This leaves some redundant and isolated nodes in an NG but does not harm on the performance. Moreover, an addition of new AP can be also detected by overlap tests. Once a new AP is found responding overlap tests, all other overlapping APs will add an temporary edge to new AP and run the timer to see if it is an actual NG edge.

Figure 6:
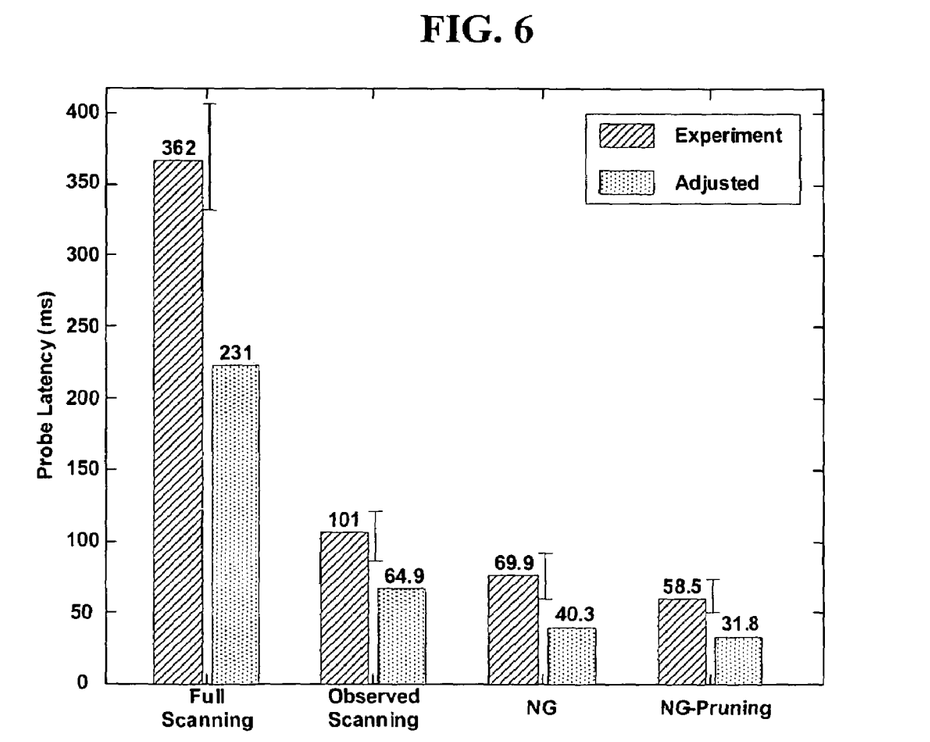
FIG. 6 is a graph illustrating simulation results of performance comparison between a NG-based probing methods of the present invention and a conventional probing method.

FIG. 6 is a graph illustrating performance simulation results of an NG-based probing methods and conventional probing methods. The simulation is carried out in a deployed 802.11b campus network by measuring about 250 handoffs. The NG-based probing algorithm according to the first embodiment of the present invention reduced the probing latencies of the conventional full-scanning and observed-scanning algorithms by 80.7% and 30.8%, respectively. Particularly, the NG-pruning-based probing algorithm according to the second embodiment of the present invention reduced the latencies of the conventional full-scanning and observed-scanning algorithms by 83.9% and 42.1%, respectively.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

In the present invention, as described above, the probing process is performed with an improved neighbor graph to reduce the probing latency, such that it is possible to conduct the seamless handoff.

Also, the probing method of the present invention is implemented with a novel non-overlap graph for constructing the neighbor graph such that the probing latency is dramatically reduced, resulting in reduction of handoff delay tolerably.

Furthermore, the probing method of the present invention minimizes the handoff delay by adopting the novel neighbor graph scheme so as to allow the speed data communication service in the wireless network.

What is claimed is:

1. A probing method for handoff of a station between access points in wireless communication system comprising:
   constructing a group of neighbor access points of a current access point with which the station is associated;
   generating subgroups of the neighbor access points by a channel assigned to the access points;
   probing the access points by subgroup in a subgroup selection order; and
   selecting the neighbor access point having a best link quality as a target access point to handoff.

2. The method of claim 1, wherein the step of probing the access points comprises:
   transmitting a probe request message to the neighbor access points of a first subgroup;
   starting a timer upon transmitting the probe request message, the timer defining a minimum channel time and a maximum channel time;
   determining whether the probe response message is received in response to the probe request message before the minimum channel time expires; and
   probing the neighbor access points of a next subgroup if a probe response message is not received.

3. The method of claim 2, wherein the step of probing the access points further comprises:
   determining whether the probe response message is received from all the access points in the subgroup, if a probe response message is received; and
   probing the neighbor access points of a next subgroup to probe, if a probe response message is received from all the access points in the subgroup.

4. The method of claim 3, wherein the step of probing the access points further comprises:
   determining whether the maximum channel time expires, if a probe response message is not received from all the access points in the subgroup; and
   probing the neighbor access points of a next subgroup to probe, if the maximum channel time expired.

5. The method of claim 2, wherein the minimum channel time is less than the maximum channel time.

6. A probing method for handoff of a station between access points in a wireless communication system comprising:
   constructing a group of neighbor access points of a current access point with which the station is associated;
   generating subgroups of the neighbor access points using a channel assigned to the access points;
   generating non-overlap graphs of the respective subgroups;
   selecting one of the subgroups to probe on the basis of degrees of the non-overlap graphs;
   probing the access points of the selected subgroup; and
   selecting one of the access points having a best quality as a target access point to handoff.

7. The method of claim 6, wherein in the non-overlap graphs pairs of access points are connected through an edge and coverage areas of the access points of each pair are non-overlapping.

8. The method of claim 7, wherein the degree of the non-overlap graph is determined by an average number of edges of the access points of the selected subgroup.

9. The method of claim 8, wherein the step of probing the access points comprises:
   transmitting a probe request message to the access points of the selected subgroup;
   starting a timer upon transmitting the probe request message, the timer defining a minimum channel time and a maximum channel time;
   determining whether a probe response message is received in response to the probe request message before the minimum channel time expires; and
   selecting a next subgroup to probe if a probe response message is not received.

10. The method of claim 9, wherein the step of selecting the best available access point further comprises:
    removing access points having the non-overlapping relationship with access points transmitting the probe response message from the non-overlap graph, if a probe response message is received;
    determining whether the selected access point exists in the selected subgroup; and
    selecting a next subgroup to probe if no access points exist.

11. The method of claim 10, wherein the step of selecting the best available access point further includes:
    determining whether the maximum channel time is expired, if any access points remain in the selected subgroup; and
    selecting a next subgroup to probe if the maximum channel time is expired.

* * * * *